(12) United States Patent
Hammer et al.

(10) Patent No.: US 10,590,970 B2
(45) Date of Patent: Mar. 17, 2020

(54) PLASTIC COMPONENT COMPRISING A CONNECTING ELEMENT

(71) Applicant: Bayerische Motoren Werke Aktiengesellschaft, Munich (DE)

(72) Inventors: Maik Hammer, Bruckberg (DE); Johann Van Niekerk, Munich (DE); Juergen Greil, Woerthsee (DE); Lars Leichtl, Fichtelberg (DE); Katrin Krukowski, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 225 days.

(21) Appl. No.: 15/285,547

(22) Filed: Oct. 5, 2016

(65) Prior Publication Data

US 2017/0023036 A1   Jan. 26, 2017

Related U.S. Application Data

(63) Continuation of application No. PCT/EP2015/055000, filed on Mar. 11, 2015.

(30) Foreign Application Priority Data

Apr. 7, 2014 (DE) .................. 10 2014 206 640

(51) Int. Cl.
*F16B 5/01* (2006.01)
*F16B 5/06* (2006.01)
(Continued)

(52) U.S. Cl.
CPC .............. *F16B 5/01* (2013.01); *F16B 5/0642* (2013.01); *F16B 21/073* (2013.01); *F16B 2/20* (2013.01); *F16B 43/00* (2013.01); *F16B 43/02* (2013.01)

(58) Field of Classification Search
CPC .............. F16B 5/10; F16B 43/02; F16B 5/01
(Continued)

(56) References Cited

U.S. PATENT DOCUMENTS 2,967,593 A * 1/1961 Cushman .................. F16B 5/01
                                                                    16/2.1
3,008,552 A * 11/1961 Cushman .................. F16B 5/01
                                                                    16/2.1
(Continued)

FOREIGN PATENT DOCUMENTS

CN        101273207 A     9/2008
CN        201891700 U     7/2011
(Continued)

OTHER PUBLICATIONS

Chinese-language Office Action issued in counterpart Chinese Application No. 201580004004.X dated Mar. 30, 2017 with English translation (Fifteen (15) pages).
(Continued)

*Primary Examiner* — Flemming Saether
(74) *Attorney, Agent, or Firm* — Crowell & Moring LLP

(57) ABSTRACT

A plastic component has a connecting element that includes an attachment portion protruding at least in part from the plastic component as well as an anchoring portion, by which the connecting element is releasably connected to the plastic component and which has a smaller cross-sectional diameter than the attachment portion.

12 Claims, 1 Drawing Sheet

(51) Int. Cl.
  *F16B 21/07* (2006.01)
  *F16B 21/00* (2006.01)
  *F16B 2/20* (2006.01)
  *F16B 43/00* (2006.01)
  *F16B 43/02* (2006.01)

(58) Field of Classification Search
  USPC .................................................. 411/380, 537
  See application file for complete search history.

(56) References Cited

U.S. PATENT DOCUMENTS

| | | | | |
|---|---|---|---|---|
| 3,137,887 | A * | 6/1964 | Mannino | F16B 5/01 16/2.1 |
| 3,318,622 | A * | 5/1967 | Crumpler | B64C 1/06 403/184 |
| 3,526,072 | A * | 9/1970 | Campbell | F16B 5/01 29/452 |
| 3,977,146 | A * | 8/1976 | Wiley | F16B 5/01 52/787.1 |
| 4,127,037 | A * | 11/1978 | Weaver | G05G 1/56 411/380 |
| 4,307,864 | A | 12/1981 | Benoit | |
| 4,717,612 | A * | 1/1988 | Shackelford | B32B 3/12 428/116 |
| 5,542,777 | A * | 8/1996 | Johnson | B61D 17/043 403/384 |
| 5,682,678 | A * | 11/1997 | Gallagher | F16B 5/01 29/402.15 |
| 5,697,650 | A * | 12/1997 | Brown | B05B 15/658 285/197 |
| 8,220,222 | B2 * | 7/2012 | Ciprian | B64C 1/06 244/118.6 |
| 8,568,072 | B2 * | 10/2013 | Suefuji | F16B 37/122 411/303 |
| 9,976,583 | B2 * | 5/2018 | Lopez | B32B 7/08 |
| 2008/0213034 | A1 | 9/2008 | Wood et al. | |
| 2008/0302060 | A1 | 12/2008 | Ciprian | |
| 2015/0033532 | A1 | 2/2015 | Van Niekerk et al. | |
| 2015/0137560 | A1 * | 5/2015 | Preisler | B32B 7/12 296/193.07 |

FOREIGN PATENT DOCUMENTS

| | | |
|---|---|---|
| DE | 198 16 099 A1 | 10/1999 |
| DE | 10 2004 045 845 B3 | 12/2005 |
| DE | 10 2008 061 463 A1 | 6/2010 |
| DE | 10 2012 206 938 B3 | 2/2013 |
| DE | 10 2012 017 347 A1 | 3/2013 |
| DE | 10 2012 022 959 A1 | 5/2013 |
| DE | 10 2012 205 892 A1 | 10/2013 |
| DE | 10 2012 214 682 B3 | 10/2013 |
| DE | 10 2012 223 853 A1 | 6/2014 |
| FR | 2 891 325 A1 | 3/2007 |

OTHER PUBLICATIONS

International Search Report (PCT/ISA/210) issued in PCT Application No. PCT/EP2015/055000 dated Jun. 10, 2015, with English translation (six (6) pages).

German Search Report issued in counterpart German Application No. 10 2014 206 640.9 dated Feb. 6, 2015, with partial English translation (eleven (11) pages).

Chinese-language Office Action issued in counterpart Chinese Application No. 201580004004.X dated Sep. 27, 2017 with English translation (16 pages).

* cited by examiner

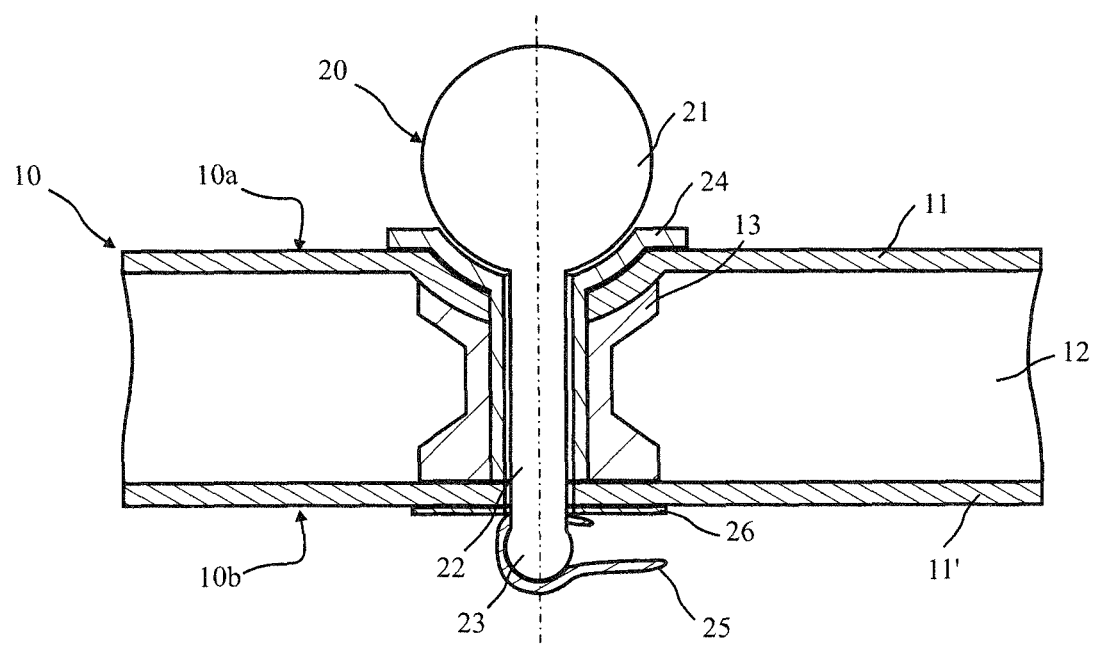

PLASTIC COMPONENT COMPRISING A CONNECTING ELEMENT

CROSS REFERENCE TO RELATED APPLICATIONS

This application is a continuation of PCT International Application No. PCT/EP2015/055000, filed Mar. 11, 2015, which claims priority under 35 U.S.C. § 119 from German Patent Application No. 10 2014 206 640.9, filed Apr. 7, 2014, the entire disclosures of which are herein expressly incorporated by reference.

BACKGROUND AND SUMMARY OF THE INVENTION

The invention relates to a plastic component with a connecting element, wherein the connecting element has an attachment portion protruding at least partly from the plastic component.

In order to reduce emissions and lessen fuel consumption, efforts are being made in modern automobile design to reduce the overall weight of the vehicle. One approach here is the use of new materials, such as fiber-reinforced plastics for example, for the fabrication of structural components or outer skin components that were formerly manufactured for the most part from metallic materials, such as sheet metal. The use of carbon fiber-reinforced components or glass fiber-reinforced components has become established in the meantime.

Problems arise in the manufacturing of assemblies or subassemblies in which components made of fiber-reinforced plastic and components made of metallic material are combined involving the joining of these components. Known bonding techniques such as welding cannot be used for these material combinations.

A fastening device for a tank of an automobile is known from DE 10 2012 022 959 A1, including a roughly angle-shaped bracket for receiving the tank, the bracket consisting of a fiber composite plastic.

Starting from this prior art, the problem which the invention proposes to solve is the specification of a plastic component with which the drawbacks of the prior art are overcome. A special problem of the invention is to provide a plastic component which can be joined into an assembly with other components which are made of other materials.

This problem is solved by a plastic component according to the invention, which provides a plastic component with a connecting element, wherein the connecting element has an attachment portion which protrudes at least partly from the plastic component and an anchoring portion with which the connecting element is releasably joined to the plastic component. The anchoring portion can have a smaller cross sectional circumference than the attachment portion. Consequently, the cross sectional area or the cross section in the anchoring portion is in itself smaller than in the attachment portion. In this way, the connecting element can be introduced by its anchoring portion in an opening of a plastic component.

Reinforcement fibers in the context of this invention can be organic or inorganic reinforcement fibers. The reinforcement fibers can be formed of carbon fibers, for example. These form with the plastic matrix a carbon fiber-reinforced plastic, also known as CFP (carbon fiber-reinforced plastic). The corresponding fiber-reinforced plastic component is then a CFP component. The reinforcement fibers can also be formed as glass fibers, for example. These then form with the plastic matrix a glass fiber-reinforced plastic, also known as GFP. However, the invention should not be restricted to this, since one can also use reinforcement fibers made of aramid, polyester, nylon, polyethylene, DMNA, basalt, boron, ceramic, steel, natural fibers and/or a combination of these fibers. These fibers are then embedded in a plastic matrix.

The material of the plastic matrix may have, in particular, one or more thermoplastic plastics (thermoplasts) and/or duroplastic plastics (duroplasts). Fiber-reinforced plastics with a thermoplastic matrix have the advantage that they can be afterwards shaped or welded to other thermoplasts. Suitable as thermoplastic plastics are, e.g., polyether ketone (PEEK), polyphenylene sulfide (PPS), polysulfone (PSU), polyether imide (PEI) and/or polytetrafluoroethylene (PTFE). Fiber-reinforced plastics with a duroplastic matrix can no longer be shaped after the hardening or cross linking of the matrix. They have advantageously a high temperature application range. This holds especially for hot-hardening systems, which harden at high temperatures. Fiber-reinforced plastics with duroplastic matrix usually have the highest strength. One can use the following resins, e.g., as duroplastic plastics or the matrix: epoxy resins (EP), unsaturated polyester resin (UP), vinyl ester resin (VE), phenol-formaldehyde resin (PF), diallyl phthalate resin (DAP), methacrylate resin (MMA), polyurethane (PUR), amino resins, melamine resins (MF/MP) and/or urea resin (UF).

Furthermore, the attachment portion can be of an at least partly spherical shape. The spherical configuration offers the advantage that a second component with a shell-shaped bearing corresponding to the spherical shape and intended to be joined with the plastic component can be mounted on the sphere, making possible both a rotation and a tilting of the component about the spherical attachment portion. This offers the advantage that a torque and a force-free mounting of the second component on the spherical attachment portion is possible, so that little or no forces or torques are transmitted to the anchoring portion during the connecting of the plastic component to the second component.

Furthermore, the anchoring portion can include a shaft and a clamping device. In this way, the connecting element can be introduced in especially simple fashion into an opening of the plastic component, wherein the shaft protrudes through the opening and can be locked on the plastic component at an opposite side of the plastic component with the aid of the clamping device.

According to a first embodiment, the clamping device is configured in the form of a tensioner. Tensioners in the sense of the invention are levers functioning on the basis of a cam, whose eccentricity can be changed from an open position in which the connecting element is free of stress to a closed position in which the connecting element is tensioned, and vice versa. The tensioner can be fashioned as a quick release, so that the connecting element can be easily inserted into the plastic component and joined to it in a stationary manner.

In a second embodiment of the invention, the clamping device can also be configured as a screw closure. In this embodiment, the shaft has a thread on its axial end opposite the attachment portion, on which a nut can be screwed in order to secure the connecting element to the plastic component.

In both embodiments, the attachment portion can protrude from the plastic component on a first side of the plastic component and the anchoring portion can protrude at least partly on a second side of the plastic component, wherein the first and the second side of the plastic component lie opposite each other.

Furthermore, the plastic component can be a fiber-reinforced plastic component, wherein reinforcement fibers are arranged in a matrix.

According to one preferred embodiment, the plastic component is configured as a sandwich component with a core and at least one reinforcement layer. The reinforcement layer can be arranged on one side of the core or on both sides of the core. Alternatively, the core can also have the reinforcement layer wound or braided around it. The reinforcement layer is then fashioned as a cover layer or cover ply. The sandwich component has the advantage that the reinforcement layers are arranged at the margin, and thus confer high mechanical properties on the sandwich component, while a relatively more economical and lighter core can be placed on the inside.

Furthermore, an opening can be provided, which runs through the plastic component from its first side to its second side and in which at least the anchoring portion of the connecting element can be inserted.

Furthermore, an insert resistant to compressive force can be provided in the opening, by which a pretensioning force can be transmitted between the attachment portion of the connecting element and the clamping device. In this way, when the connecting element is mounted on the plastic component, one can avoid the plastic component being subjected to compressive forces due to pretensioning forces. Instead, the pretensioning force acts via the insert and a part of the plastic component on the clamping device. The insert can be fashioned as a bushing, edge bushing, or double edge bushing.

According to an especially preferred embodiment of the invention, the sandwich component includes a core, which is provided with a first cover layer, forming the first side of the plastic component, and with a second cover layer, forming the second side of the plastic component. The opening is fashioned as a round borehole, which has a first diameter in the area of the first cover layer and the core and a second diameter which is smaller than the first diameter in the area of the second cover layer. In this way, a step or collar formed in the circumferential direction is formed in the opening upon passing from the large diameter to the small diameter in the axial direction. The insert is introduced into the opening in the area of the larger diameter until it comes up against the encircling collar. During the tensioning of the connecting element, a flow of force is created from the attachment portion to the insert, across the encircling collar, to the second cover layer. A counter force is applied with the clamping device. The core is usually made of a resilient foam material, and thus is unsuited to absorbing the pretensioning forces. Upon application of pretensioning forces, the foam core would yield and show shrinkage effects, by virtue of which the connecting element would be loosened from the plastic component.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a cross-sectional view of the basic layout of a plastic component with connecting element arranged on it according to an embodiment of the invention.

DETAILED DESCRIPTION OF THE DRAWINGS

FIG. 1 shows a sectional view through a plastic component 10 with a connecting element 20 arranged on it. The plastic component 10 is fashioned as a sandwich component with a first reinforcement layer 11, which is shown in FIG. 1 as the top reinforcement layer 11, and a second reinforcement layer 11', which is shown in FIG. 1 as the bottom reinforcement layer. The reinforcement layers 11, 11' are formed from a fiber-reinforced plastic, in which reinforcement fibers are incorporated in a matrix material, for example an epoxy resin, of a thermoplastic or duroplastic matrix. The top reinforcement layer 11 forms a first side 10$a$ of the composite component. The bottom reinforcement layer 11' forms a second side 10$b$ of the composite component 10. Between the reinforcement layers 11, 11' there is placed a core 12. The core 12 surrounds an insert 13, having an inner borehole or an opening through which at least the connecting element 20 can extend. Preferably, during the fabrication of the composite component 10, the insert 13 is already integrated when creating the core 12 in that the insert 13 has the core-forming material foamed around it. Suitable as the material is, e.g., polyurethane (PUR) foam. Alternatively to the foam, the core 12 can also be made of wood.

The foam core can have a density in the range of 70 kg/m$^3$ to 250 kg/m$^3$. Various materials are suitable in making the foam core, especially polyurethane foam (PU foam), polyethylene foam (PET foam), polyvinyl chloride foam (PVC foam), polymethacrylimide foam (PMI foam) or polyether imide foam (PEI foam).

The connecting element 20 is formed as a spherical-head bolt. It includes an attachment portion 21 and an anchoring portion, the latter being formed from a shaft 22 and a clamping device. The clamping device is depicted in FIG. 1 as a tensioner 25, which is provided at one axial end of the shaft 22 that is opposite the axial end of the shaft 22 at which the spherical attachment portion 21 is arranged. Consequently, with the anchoring portion, the connecting element 20 can be arranged firmly on the plastic component 10. As can be seen from FIG. 1, the opening through the plastic component 10 is fashioned as a circular borehole. This borehole has a larger diameter in the area of the first reinforcement layer 11 and in the area of the foam core 12. In the area of the bottom cover layer 11', the borehole has a smaller diameter. The bottom cover layer 11' forms an abutment in the form of an encircling collar in the circumferential direction at the passage from the top region to the bottom region. An insert 24 is inserted in the top region of the opening. This insert 24 is depicted in FIG. 1 as a bushing with a flange. The flange is shown in the upper region of the bushing 24 in FIG. 1. The bushing 24 consequently abuts by its lower end against the bottom cover layer 11'. When mounting the connecting element 20 in the plastic component 10, at first the bushing 24 is introduced into the opening. After this, the connecting element 20 is introduced into a borehole running in the axial direction of the bushing. A pretensioning force is then created with the clamping device, so that the attachment portion 21 is pretensioned via the bushing 24 with the bottom cover layer and the clamping device. For this, the clamping device 25 is turned about a spherical bearing 23. This bearing 23 is formed at the axial end of the shaft 22, facing the clamping device 25.

FIG. 1 shows a washer 26, although this is purely optional. The pretensioning force ensures that the connecting element 20 or the spherical-head bolt is secured firmly and free of play on the plastic component 10. No force is transmitted to the plastic component 10. This would mean that the cover layer 11 and the cover layer 11' are squashed together, applying pressure to the core 12. Such effects are unwanted, since they result in a creep behavior in the long term, which damages the plastic component 10.

In order to ensure a firm purchase, free of play, the length of the connecting element 20, i.e., the distance between the attachment portion 21 and the clamping device, is matched up with the length of the insert 24 and the thickness of the composite component 10.

As is further evident from FIG. 1, the flange of the abutment element 24 has a curvature which is matched up with the curvature of the spherical attachment portion 21. A corresponding curvature is also provided in the cover layer 11. This curvature offers the advantage of allowing an equalizing of tolerances when the connecting element 20 is inserted into the bushing 24 or the insert 24. This is a major advantage over embodiments in which the insert 24 is fashioned as a conventional bushing, where the region of the flange forms a shoulder at right-angles to the area of the cylindrical sleeve. In another embodiment, the insert 24 can be fashioned as a cylindrical sleeve, with no flange.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A plastic component connection system, comprising:
a plastic component; and
a connecting element, the connecting element comprising:
an attachment portion which is of an at least partly spherical shape, where a portion of the at least partly spherical shape protrudes at least partly from the plastic component; and
an anchoring portion with which the connecting element is releasably joined to the plastic component, wherein
the anchoring portion includes a shaft, a clamping device, and a spherical bearing that is formed at an axial end of the shaft that faces the clamping device, wherein the clamping device is turned about the spherical bearing, and
the plastic component is a sandwich component with a core and at least one reinforcement layer, where the core is formed by foam material or wood.

2. The plastic component connection system according to claim 1, wherein the clamping device is configured as a tensioner.

3. The plastic component connection system according to claim 2, wherein the tensioner is a cam lever.

4. The plastic component connection system according to claim 1, wherein:
the attachment portion protrudes from the plastic component on a first side of the plastic component and the anchoring portion protrudes at least partly on a second side of the plastic component, and
the first and the second side of the plastic component lie opposite each other.

5. The plastic component connection system according to claim 1, wherein an opening is provided, which runs through the plastic component from a first side to a second side and into which at least the anchoring portion of the connecting element is inserted.

6. The plastic component connection system according to claim 5, wherein:
the sandwich component comprises a core, with a first cover layer, forming the first side, and a second cover layer, forming the second side, and
the opening is configured as a round borehole, which has a first diameter in the area of the first cover layer and the core and a second diameter which is smaller than the first diameter in the area of the second cover layer, whereby the second cover layer forms an encircling collar in the axial direction of the opening, against which an insert abuts.

7. The plastic component connection system according to claim 1, wherein the core is formed by polyurethane foam (PU foam), polyethylene foam (PET foam), polyvinyl chloride foam (PVC foam), polymethacrylimide foam (PMI foam), or polyether imide foam (PEI foam).

8. A plastic component connection system, comprising:
a plastic component; and
a connecting element, the connecting element comprising:
an attachment portion which is of an at least partly spherical shape, where a portion of the at least partly spherical shape protrudes at least partly from the plastic component; and
an anchoring portion with which the connecting element is releasably joined to the plastic component, wherein
the anchoring portion includes a shaft, a clamping device, and a spherical bearing that is formed at an axial end of the shaft that faces the clamping device, wherein the clamping device is turned about the spherical bearing, and
an insert resistant to compressive force is provided in an opening, by which a pretensioning force is transmittable between the attachment portion and the clamping device.

9. The plastic component connection system according to claim 8, wherein:
the plastic component is a sandwich component which comprises a core, with a first cover layer, forming the first side, and a second cover layer, forming the second side, and
the opening is configured as a round borehole, which has a first diameter in the area of the first cover layer and the core and a second diameter which is smaller than the first diameter in the area of the second cover layer, whereby the second cover layer forms an encircling collar in the axial direction of the opening, against which the insert abuts.

10. The plastic component connection system according to claim 8, wherein the insert is configured as a bushing with a flange.

11. The plastic component connection system according to claim 8, wherein the clamping device is configured as a tensioner.

12. The plastic component connection system according to claim 11, wherein the tensioner is a cam lever.

* * * * *